(12) United States Patent
McAllister, Jr. et al.

(10) Patent No.: US 11,279,116 B2
(45) Date of Patent: Mar. 22, 2022

(54) FILM HAVING AN OXYGEN SCAVENGER AND A VOLATILE ORGANOLEPTIC COMPOUND SCAVENGER

(71) Applicant: Cryovac, Inc., Charlotte, NC (US)

(72) Inventors: Larry B. McAllister, Jr., Spartanburg, SC (US); Cynthia Louise Ebner, Greer, SC (US); Drew V. Speer, Simpsonville, SC (US); Kemia Amin Anders, Charlotte, NC (US)

(73) Assignee: Cryovac, LLC, Charlotte, NC (US)

( * ) Notice: Subject to any disclaimer, the term of this patent is extended or adjusted under 35 U.S.C. 154(b) by 54 days.

(21) Appl. No.: 16/095,952

(22) PCT Filed: Apr. 27, 2017

(86) PCT No.: PCT/US2017/029819
§ 371 (c)(1),
(2) Date: Oct. 24, 2018

(87) PCT Pub. No.: WO2017/189836
PCT Pub. Date: Nov. 2, 2017

(65) Prior Publication Data
US 2019/0134958 A1 May 9, 2019

Related U.S. Application Data

(60) Provisional application No. 62/328,054, filed on Apr. 27, 2016.

(51) Int. Cl.
*B32B 27/08* (2006.01)
*B32B 27/30* (2006.01)
(Continued)

(52) U.S. Cl.
CPC ............ *B32B 27/08* (2013.01); *A23L 3/3436* (2013.01); *B32B 27/18* (2013.01); *B32B 27/20* (2013.01); *B32B 27/304* (2013.01); *B32B 27/306* (2013.01); *B32B 27/308* (2013.01); *B32B 27/32* (2013.01); *B32B 27/34* (2013.01);
(Continued)

(58) Field of Classification Search
None
See application file for complete search history.

(56) References Cited

U.S. PATENT DOCUMENTS

| 5,834,079 A | 11/1998 | Blinka et al. | |
|---|---|---|---|
| 6,042,906 A * | 3/2000 | Itoh | B32B 27/32 428/35.2 |
| 2009/0318584 A1 * | 12/2009 | Speitling | C08L 89/00 523/111 |

FOREIGN PATENT DOCUMENTS

WO 2006/011926 2/2006

* cited by examiner

*Primary Examiner* — Ronak C Patel
(74) *Attorney, Agent, or Firm* — Jason R. Womer

(57) ABSTRACT

A zeolite formulation has been identified that is to be included in an arrangement of barrier layers allowing for the entrapment of volatile organoleptic compound (VOCs), in particular, odor causing VOCs, between the barrier layers in order to contain the release of these compounds. The entrapment technique allows for extended time to adsorb, absorb or react such VOCs before they can be absorbed by the product surrounded by the packaging. A zeolite formulation of an odor scavenger layer not having any VOC barrier layers within the film is also disclosed having the capability to contain the release of hydrogen sulfide over a period of at least 20 days.

8 Claims, 2 Drawing Sheets

(51) Int. Cl.
*A23L 3/3436* (2006.01)
*B65D 65/40* (2006.01)
*B32B 27/36* (2006.01)
*B32B 27/34* (2006.01)
*B32B 27/32* (2006.01)
*B32B 27/18* (2006.01)
*B32B 27/20* (2006.01)

(52) U.S. Cl.
CPC .............. *B32B 27/36* (2013.01); *B65D 65/40* (2013.01); *B32B 2250/03* (2013.01); *B32B 2250/04* (2013.01); *B32B 2250/05* (2013.01); *B32B 2250/24* (2013.01); *B32B 2250/242* (2013.01); *B32B 2250/246* (2013.01); *B32B 2250/40* (2013.01); *B32B 2250/42* (2013.01); *B32B 2264/102* (2013.01); *B32B 2264/104* (2013.01); *B32B 2264/12* (2013.01); *B32B 2307/726* (2013.01); *B32B 2307/7244* (2013.01); *B32B 2307/74* (2013.01); *B32B 2307/758* (2013.01); *B32B 2439/06* (2013.01)

FILM HAVING AN OXYGEN SCAVENGER AND A VOLATILE ORGANOLEPTIC COMPOUND SCAVENGER

FIELD OF INVENTION

The present invention relates to a film having an oxygen scavenger and a volatile organoleptic compound (VOC) scavenger, in particular, a scavenger for an odor causing VOC. In particular, the film of the present invention maintains substantial oxygen barrier properties and VOC barrier properties even upon activation.

BACKGROUND

Polymeric films are used in a wide variety of packaging applications, including food packaging, pharmaceutical products and non-perishable consumer goods. Films suitable for each of these applications are typically required to exhibit a range of physical properties. Food packaging films in particular may be required to meet numerous demanding performance criteria, depending on the specific application, such as protection from the environment, resistance to physical and environmental abuse during processing, storage and distribution, and an aesthetic and attractive appearance. Optical properties such as high gloss, high clarity, and low haze contribute to the aesthetic consumer appeal of products wrapped in such packaging materials. Good optical properties also permit adequate inspection of the packaged product during the distribution cycle and by the end-user at point of purchase.

In the case of perishable products, such as oxygen sensitive products, oxygen barrier characteristics are required to provide extended shelf life for the packaged product. Limiting the exposure of oxygen-sensitive products to oxygen maintains and enhances the quality and shelf life of many products. For instance, by limiting the oxygen exposure of oxygen-sensitive food products in a packaging system, the quality of the food product can be maintained and spoilage retarded. In addition, such packaging also keeps the product in inventory longer, thereby reducing costs incurred from waste and having to restock.

In the food packaging industry, several techniques for limiting oxygen exposure have been developed. Common techniques include those where oxygen is consumed within the packaging environment by some means other than the packaged article or the packaging material—e.g., through the use of oxygen scavenging sachets—those where reduced oxygen environments are created in the package—e.g., modified atmosphere packaging (MAP) and vacuum packaging—and those where oxygen is prevented from entering the packaging environment—e. g., barrier films). Packaged product may also have residual oxygen. In a hermetically sealed packaged, scavenging provides a means of eliminating the negative effects of the oxygen on the quality and shelf-life of the product.

In the past, oxygen scavenging materials have been incorporated into the packaging structure. This technique (also referred to as "active oxygen barrier") can provide a certain scavenging effect throughout the package and a means to intercept and scavenge oxygen as it passes through the walls of the package, thereby reducing the possible oxygen level through the package.

Conventionally, active oxygen barriers have been formed by incorporating inorganic powders and/or salts as part of the package. However, incorporation of such powders and/or salts can degrade the transparency and mechanical properties—e. g., tear strength—of the packaging material and can complicate processing, especially where thin films are desired. Also, in some cases these compounds as well as their oxidation products can be absorbed by food in the container, which can result in the food product failing to meet governmental standards for human consumption.

In addition, various films have been developed to help provide oxygen barrier properties to the packaging. For example, ethylene vinyl alcohol copolymer (EVOH) has been known as a good oxygen barrier material, and has been used in the past in conjunction with multilayer packaging films. However, many of these films may still permit some oxygen to pass through the film and eventually enter the package. As a result, the film may not provide the desired level of oxygen barrier properties.

Additionally, packaged foods may be subjected to microbial decontamination and shelf-life improvement, which have also proven effective in preserving the quality of the food and extending the shelf-life of the food products. For example, electronic beam ("eBeam") processing can be effective in achieving a certain level of food safety and quality assurance protocol. Such techniques may be combined with other treatment techniques, such as, for example, IR technology or UV technology to provide a preferred synergistic effect of food treatment. Other processes for elimination of bacteria and microbes utilize a high pressure pasteurization process (HPP), which can be an effective method that does not utilize heat. However, when such treatment techniques are used on pre-packaged foods, volatile organic compounds having certain undesirable odor causing capability may be generated. Use of more rigorous techniques require the use of a film that not only maintains an oxygen scavenging characteristic but also possesses an odor causing compound scavenging capability to reduce or substantiality eliminate the volatile organic compounds that may be generated as a result of using such treatment techniques. Such odor possessing compounds that are generated during the treatment process may undesirably alter the flavor of the food product—i.e., otherwise known as creating organoleptic issues within the packaged product.

It has also been found that oxygen scavenging structures can generate reaction byproducts that can affect the taste and smell of the packaged material (organoleptic properties). Such byproducts have previously been found to include acids, aldehydes and ketones. While it has been found that zeolites (e.g., organophillic zeolites in particular) absorb such odor-causing reaction products, which can be exacerbated upon being exposed to these other treatment techniques, it has not been found, in particular, that any such zeolites may be effective at absorbing the odor-causing reaction byproducts that are generated at more extreme processing conditions. These types of byproducts tend to include dienes, trienes, alcohols, ketones as well as other types of materials.

There remains a need in the art for a film and/or a method of using a film that possesses an oxygen scavenging capability but also reduces if not substantially eliminates the volatile organic compounds possessing undesirable taste and odor characteristics generated from a more rigorous food processing technique, such as, for example, eBeam processing.

Coextruded multi-layer polymer films can contain materials that are organoleptically unpleasant. When used in packaging applications, these volatile organoleptic compounds (VOCs) can be readily absorbed from the film into the packaged product. This can have a negative impact on the product.

SUMMARY OF INVENTION

The present invention relates to a film possessing an active oxygen barrier capability but also acts to reduce if not substantially scavenge volatile organic compounds that are generated, according to an embodiment of the invention, as a result of food treatment processes that are applied to a packaged food item. The present invention also provides methods for using such a film during such food treatment processes.

In an embodiment of the invention, the film comprises a bulk layer for scavenging a volatile organoleptic compound (VOC), an oxygen scavenger layer; and an interior barrier layer and a barrier substrate layer, wherein the bulk layer and the oxygen scavenger layer are disposed between the interior barrier layer and the barrier substrate layer. Additionally, the interior barrier layer and the barrier substrate layer may be configured to be permeable to oxygen but act as barriers to the VOC.

In certain embodiments of the invention, the VOC is odor causing. Furthermore, the VOC that cannot penetrate the interior barrier layer and has a molecular weight of greater than about 40.

The bulk layer may comprise any one or more of zeolite 5A, zeolite 13X, SYLOID® Al-1, Abscents 3000, MgO, and ZnO. In some embodiments, where the film is used with a food product in liquid form, zeolite 5A may be used. Zeolite 5A may be an effective odor absorber when scavenging odors where the film is used with a food product that is a liquid.

In certain embodiments of the invention, the zeolite 13X of the bulk layer ranges from about 5 wt % to about 15 wt % based on the total weight of the bulk layer. In other embodiments of the invention the SYLOID® Al-1 of the bulk layer is greater than about 5 wt % based upon the total weight of the bulk layer.

In an embodiment of the invention, the film may have a bulk layer comprising a zeolite formulation having any one or more of zeolite 5A, zeolite 13X, Abscents 3000, MgO, ZnO and SYLOID® Al-1. Further pursuant to these embodiments of the invention, the zeolite formulation has a range of from about 0.5 wt % to 20 wt % of zeolite 5A, about 1 wt % to about 20 wt % of zeolite 13X; a range of from about 0.04 wt % to about 5 wt % of Abscents 3000; a range of from about 0.08 wt % to about 6 wt % of MgO; a range of from about 0.08 wt % to about 5 wt % of ZnO; a range of from about 0.04 wt % to about 5 wt % of SYLOID® Al-1 based upon the total weight of the bulk layer. In still other embodiments of the invention, the zeolite formulation has a range of from about 1 wt % to 5 wt % of zeolite 5A, about 1.5 wt % to about 4.5 wt % of zeolite 13X; a range of from about 0.05 wt % to about 0.25 wt % of Abscents 3000; a range of from about 0.1 wt % to about 0.25 wt % of MgO; a range of from about 0.1 wt % to about 0.25 wt % of ZnO; and a range of from about 0.05 wt % to about 0.15 wt % of SYLOID® Al-1 based upon the total weight of the bulk layer.

In certain embodiments of the invention, at least about 88% of the VOC is removed. In certain embodiments of the invention, substantially all of the VOCs present are removed.

In an embodiment of the invention, the oxygen scavenger layer may comprise, based upon a total weight of the oxygen scavenger layer, from about 0.1 wt % to about 2 wt % of a cobalt catalyst, from about 0.1 wt % to about 2 wt % of at least one of tetraisopropyl titanate and titanium isopropoxide, and from about 0.1 wt % to about 2 wt % of a-tocopherol.

In an embodiment of the invention, the barrier substrate layer may comprise a polyethylene terephthalate. In certain embodiments of the invention, the barrier substrate layer is coated with an aluminum oxide.

An aspect of the invention provides a method for scavenging an odor causing VOC compound comprising containing the VOC compounds between an inner barrier layer and an outer barrier layer, allowing oxygen to permeate the inner barrier layer, scavenging oxygen at least in an oxygen scavenger layer, and scavenging the VOC compound in a bulk layer. In an embodiment of the invention, the method for scavenging the odor causing VOC additionally comprises scavenging at least some of the odor causing VOC compound in the oxygen scavenger layer.

An aspect of the invention provides a film comprising a skin layer defining an outside surface of the film, an oxygen barrier layer, and an odor scavenger layer disposed between the skin layer and the oxygen barrier layer. The film is further characterized by not having any VOC barriers within the film. Such a film is characterized by the odor scavenger layer comprising a zeolite formulation that contains the release of odor causing VOCs, such as hydrogen sulfide, over a period of at least 20 days. According to an embodiment of the invention, the zeolite formulation comprises a zeolite 5A, zeolite 13X, Abscents 3000, ZnO, MgO, and SYLOID® Al-1.

An aspect of the invention provides a film comprising a sealant layer defining a surface of the film intended to be adjacent to a packaged product, a tie layer adjacent to the sealant layer, a film strengthening layer adjacent to the tie layer, and an oxygen barrier adjacent to the film strengthening layer. A zeolite formulation is disposed in at least one of the sealant layer and the tie layer. According to an embodiment of the invention, the zeolite formulation comprises a zeolite 5A, zeolite 13X, Abscents 3000, ZnO, MgO, and SYLOID® Al-1.

Other aspects and embodiments will become apparent upon review of the following description taken in conjunction with the accompanying drawings. The invention, though, is pointed out with particularity by the included claims.

BRIEF DESCRIPTION OF THE DRAWINGS

Figure 1:
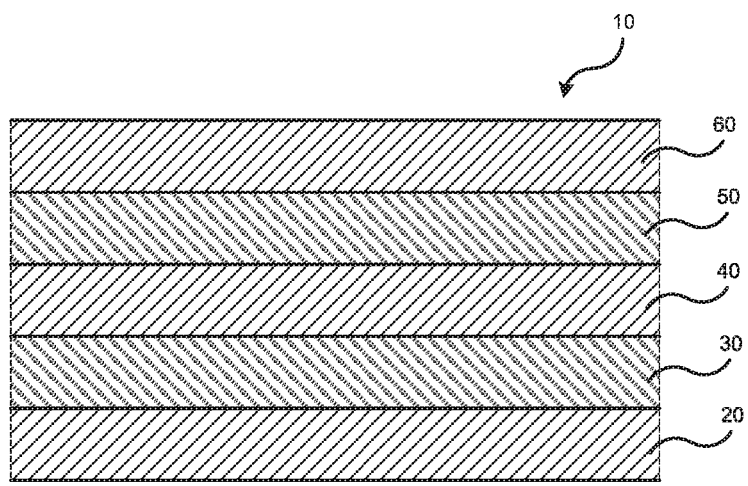
Figure 2:
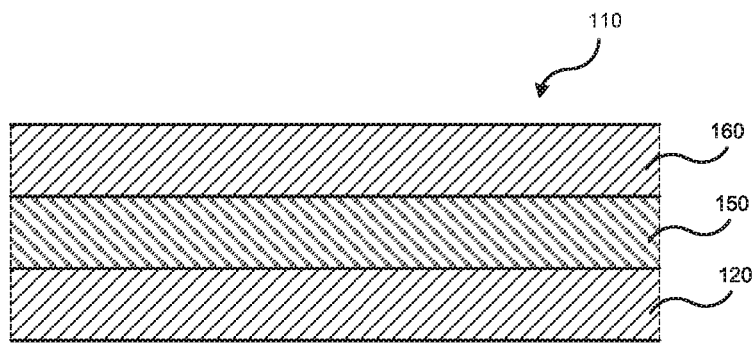
Figure 3:
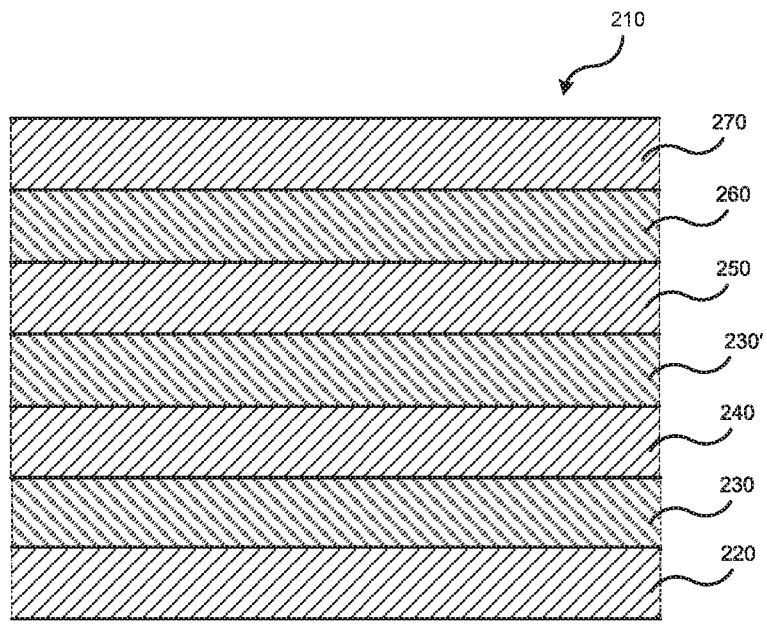
Figure 4:
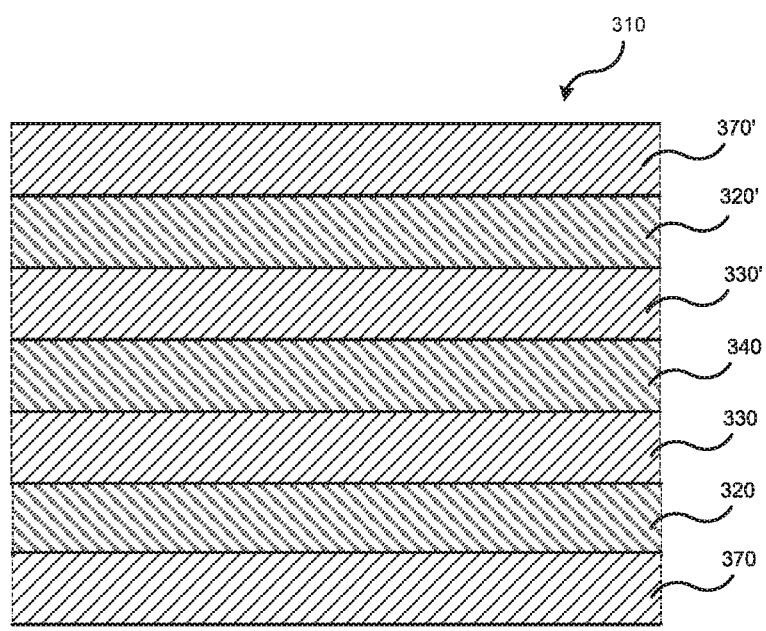

Having thus described the invention in general terms, reference will now be made to the accompanying drawings, which are not necessarily drawn to scale, and wherein:

FIG. 1 is a cross-sectional side view of a film that is in accordance with one aspect of the present invention having an oxygen scavenging barrier and a VOC scavenging barrier properties;

FIG. 2 is a cross-sectional side view of a film that is accordance with another aspect of the present invention having odor scavenger layer and a blocking layer;

FIG. 3 is a cross-sectional side view of a film that is in accordance with another aspect of the present invention having an odor scavenger layer; and FIG. 4 is a cross-sectional side view of a film that is in accordance with an embodiment of the present invention having odor causing VOC scavengers disposed in another functional layer.

DETAILED DESCRIPTION OF THE INVENTION

The present invention now will be described more fully hereinafter with reference to the accompanying drawings, in which some, but not all embodiments of the inventions are shown. Preferred embodiments of the invention may be described, but this invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments of the invention are not to be interpreted in any way as limiting the invention.

As used in the specification and in the appended claims, the singular forms "a", "an", and "the" include plural referents unless the context clearly indicates otherwise. For example, reference to "a VOC" includes a plurality of such VOCs.

It will be understood that relative terms, such as "preceding" or "followed by" or the like, may be used herein to describe one element's relationship to another element as, for example, may be illustrated in the Figures. It will be understood that relative terms are intended to encompass different orientations of the elements in addition to the orientation of elements as illustrated in the Figures. It will be understood that such terms can be used to describe the relative positions of the element or elements of the invention and are not intended, unless the context clearly indicates otherwise, to be limiting.

Embodiments of the present invention are described herein with reference to various perspectives, including, for example, perspective views that are representations of idealized embodiments of the present invention. As a person having ordinary skill in the art would appreciate, variations from or modifications to the shapes as illustrated in the Figures or the described perspectives are to be expected in practicing the invention. Such variations and/or modifications can be the result of manufacturing techniques, design considerations, and the like, and such variations are intended to be included herein within the scope of the present invention and as further set forth in the claims that follow. The articles of the present invention and their respective components described or illustrated in the Figures are not intended to reflect a precise description or shape of the component of an article and are not intended to limit the scope of the present invention.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

The invention described herein relates to a film having active oxygen barrier and volatile organic compound barrier capabilities. The film is generally comprised of an odor causing volatile organic compound scavenging capability to substantially eliminate or remove odor causing compounds by containing the release of these compounds.

As used herein, the term "odor scavenger layer" refers to a scavenger layer that has the capability to remove at least one odor causing volatile organoleptic compound (VOC). "Odor scavenger layer" may also be referred to as "odor causing volatile organoleptic compound scavenger layer".

As used herein, the term "volatile organoleptic compounds" or "VOC" or "VOCs" in its hyphenated form refers to compounds that affect a person's senses such as taste, sight, smell and/or touch.

As used herein, the term "film" refers to a film, laminate, sheet, web, coating, coextruded multi-layer film or the like that can be used in packaging a product. In certain embodiments of the invention, the term "product" refers to a food product intended for human or animal consumption. The term "food product" refers to any substance that can be used or prepared for use as food. The food may be in liquid form, solid form or a combination thereof. Such food may comprise for example, fresh, raw, partially-cooked, or cooked food, such as meat, such as red meat products (e.g., beef, veal, lamb, and pork), poultry, and pre-prepared products such as pizza and pasta. Food in liquid form may include beverages such as milk, milk products, smoothies, milkshakes, soda, juice, alcohol, wine, or beer.

As used herein, the term "zeolite" or "zeolites" refer to a molecular sieve, including aluminophosphates and aluminosilicates with a framework structure enclosing cavities occupied by large ions and/or water molecules, both of which have considerable freedom of movement permitting ion exchange and reversible dehydration. The framework may also contain other cations such as manganese (Mn), titanium (Ti), cobalt (Co), and iron (Fe). Non-limiting examples of zeolite materials are the titanosilicate and titanoaluminosilicate molecular sieves. Unlike amorphous materials, these crystalline structures contain voids of discrete size. A typical naturally occurring zeolite is the mineral faujasite having the following formula: 
$Na_{13}Ca_{11}Mg_9K_2Al_{55}Si_{137}O_{384} \cdot 235H_2O$.

Ammonium and alkylammonium cations may be incorporated in synthetic zeolites, e.g. $H_4$, $CH_3NH_3$, $(CH_3)_2NH_2$, $(CH_3)_3NH$, and $(CH_3)_4N$. Some zeolites have frameworks of linked truncated octahedra (beta-cages) characteristic of the structure of sodalite. Numerous synthetic zeolites are available.

As used herein, the term "oxygen scavenger" and the like refers to a composition, article or the like that consumes, depletes or reacts with oxygen from a given environment.

According to an embodiment of the invention, a film includes a sealant layer, an oxygen scavenging layer, and a bulk layer to add bubble blowing strength, for example. Films of the invention may be laminated to a barrier film, such as, for example, a barrier PET film on the bulk layer side. Films of the invention may include a layer between the sealant layer at the inside of the package and the source of the VOCs such as an oxygen scavenging layer.

With reference to FIG. 1, a film having an oxygen scavenging barrier and a VOC scavenging barrier properties that are in accordance with one embodiment of the invention is illustrated in FIG. 1. In the embodiment illustrated in FIG. 1, the film 10 includes a sealant layer 20 a barrier layer 30, an oxygen scavenger layer 40 that may be a multilayer having an active oxygen barrier layer and at least one passive oxygen barrier layer, a bulk layer 50, and a barrier substrate layer 60. In an embodiment of the invention, the oxygen scavenger layer 40 may be a multilayer film configuration that includes a multilayer oxygen barrier component comprising at least one of 1) an active oxygen barrier layer sandwiched between two passive oxygen barrier layers, or 2) a passive oxygen barrier layer sandwiched between two active oxygen barrier layers.

According to an embodiment of the invention, the sealant layer 20 is located at the interior of a packaged food product, preferably adjacent to the food product. In an embodiment of the invention, the thickness of the sealant layer 20 may be sized thin enough to allow for a desired oxygen permeation rate allowing oxygen to reach the oxygen scavenger layer 40 to scavenge any such oxygen. Further pursuant to this embodiment of the invention, the sealant layer 20 is thick enough to obtain a desired hermetic seal providing the film packaging material with a substantially air tight seal. A thickness of the sealant layer 20 is from about 2 μm to about 50 μm, from about 4 μm to about 20 μm, from about 5 μm to about 15 μm or from about 8 μm to about 12 μm, and any range between these values.

In an embodiment of the invention, the sealant layer 20 may comprise an ethyl vinyl acetate (EVA). Other resins suitable for the sealant layer 20 include a low-density polyethylene, a linear low-density polyethylene, an intermediate-density polyethylene, a high-density polyethylene, a polypropylene, a propylene-ethylene copolymer, an ethylene-vinyl acetate copolymer, an ethylene-acrylic acid copolymer, an ethylene-methacrylic acid copolymer, an ethylene-methylacrylate copolymer, an ethylene-ethylacrylate copolymer, an ethylene-methylmethacrylate copolymer, or ionomers, and any combination thereof.

The sealant layer 20 may be formed by extrusion lamination of any of the identified resins, or alternatively, a method may also be adopted in which a film is first formed by a T die method, an inflation method or the like and is then laminated onto the heat-resistant base layer by a dry lamination method, an extrusion lamination method, or the like.

Because the barrier layer 30 is configured to significantly block odors, it could also affect the transmission of oxygen through the film and negatively affect sealing, the sealant layer 20 must be configured to balance these impacts by the barrier layer 30. According to certain embodiments of the invention, the sealant layer 20 comprises a lower melting point plastomer, a higher melt flow olefin and propylene ethylene plastomer. According to an embodiment, these components are compounded to achieve hermetic sealing at about 0.1 seconds seal time. In an embodiment of the invention, VERSIFY™ 3300 available from Dow Chemical Company was the propylene-ethylene copolymer formulation in the sealed layer 20. In an embodiment of the invention, the sealed layer 20 may additionally comprise a zeolite to further act as an odor causing VOC scavenger.

According to an embodiment of the invention, the barrier layer 30 and the barrier substrate layer 60 are configured to be permeable to oxygen but act as barriers to higher molecular weight VOCs. In an embodiment of the invention, the barrier layer 30 and the barrier substrate layer 60 act to contain the odor causing VOCs providing extended time for the VOCs to be any one or both of absorbed and/or chemically reacted. In certain embodiments of the invention, the barrier layer 30 is configured to be permeable to oxygen but to act as a barrier to VOCs having a molecular weight of greater than about 40, greater than about 50, greater than about 60, greater than about 70, greater than about 80, greater than about 90, greater than about 100, greater than about 110, or greater than about 120. In certain embodiments of the invention, the barrier substrate layer 60 is configured to be permeable to oxygen but to act as a barrier to VOCs having a molecular weight of greater than about 40, greater than about 50, greater than about 60, greater than about 70, greater than about 80, greater than about 90, greater than about 100, greater than about 110, or greater than about 120. In certain embodiments of the invention, the barrier layer 30 comprises a cyclic olefin copolymer (COC), a polylactic acid (PLA), and any combination thereof. In certain embodiments of the invention, the barrier substrate layer 60 comprises a polyethylene terephthalate (PET).

In an embodiment of the invention, the oxygen scavenger layer 40 and the bulk layer 50 are disposed between the barrier layer 30 and the barrier substrate layer 60, i.e., according to this embodiment, the barrier layer 30 is an interior barrier layer. Further pursuant to this embodiment of the invention, the interior layer is configured to act as a barrier to an odor causing VOC that has been generated within the oxygen scavenger layer 40 and the bulk layer 50 as a result of microbial decontamination and/or shelf-life improvement processing the packaged good is subjected to.

In an embodiment of the invention, the oxygen scavenger layer 40 is configured to act as the primary oxygen scavenger region of the film. The oxygen scavenger layer 40 may be configured according to the additional disclosure provided herein. In an embodiment of the invention, however, the oxygen scavenger layer comprises a polymer and/or copolymer resin, and antioxidants. One or a combination of compounds useful for oxygen scavenging may be included. Generally, oxygen scavenging components include oxidizable metal(s), oxidation promoters and fillers.

An oxygen scavenger layer 40 generally comprises a blend of a barrier polymer; an oxygen scavenging moiety, such as an oxygen scavenging nylon or EVOH; and an odor scavenging moiety. In certain embodiments of the invention, the oxygen scavenging moiety and the odor scavenging moiety of the bulk layer may be the same. The polymer resin of the oxygen scavenger layer 40 may comprise an oxygen barrier polymer according to one embodiment of the invention, an odor creating molecule barrier polymer according to another embodiment of the invention, or an oxygen barrier and an odor creating molecule barrier polymer according to yet another embodiment of the invention.

According to an embodiment of the invention, the oxygen scavenger layer 40 may include a zeolite to further promote increased oxygen permeability while perhaps also trapping odor causing VOCs as further disclosed herein, according to an embodiment of the invention. In certain embodiments of the invention, the permeability rate of the oxygen scavenger layer 40 may be increased by blending a non-barrier polymer with a cyclic olefin copolymer (COC) to achieve the desired oxygen scavenging rate required for the packaging material. In certain embodiments of the invention, a film is configured to scavenge oxygen to under 0.2% by weight within about seven to about 10 days.

In an embodiment of the invention, the oxygen scavenging compounds may comprise a metal-based scavenger. In certain embodiments of the invention, the metal-based scavenger includes iron. In another embodiment of the invention, the oxygen scavenging compounds may comprise organic reducing agents, which, in preferred embodiments, include low molecular weight organic reducing agents. Organic reducing agents that may be useful as oxygen scavenging agents, according to certain embodiments of the invention, include ascorbic acid, sodium ascorbate, and in certain embodiments of the invention, enzymatic oxygen scavenger systems may be used, which include, for example, glucose oxidase, oxalate oxidase, ethanol oxidase, lignosulfonates, a laccase, and a lactase.

Naturally occurring antioxidants may be used as oxygen scavengers according to certain embodiments of the invention. Naturally occurring compounds that may be useful as oxygen scavengers, according to an embodiment of the invention, include, but are not limited to, tocopherols—notably a-tocopherol or vitamin E, vitamin C, lecithin, organic acids, rosemary extracts, and any combination thereof. In an embodiment of the invention, the oxygen scavenger layer 40 comprises a naturally occurring compound ranging from about 0.1 wt % to about 2 wt %, from about 0.5 wt % to about 1.8 wt %, from about 0.8 wt % to about 1.6 wt %, and from about 1 wt % to about 1.5 wt % all based upon the weight of the oxygen scavenger layer 40.

One or more transition metal catalysts may be included in the oxygen scavenger layer 40, according to certain embodiments of the invention. In an embodiment of the invention, the oxygen scavenger layer 40 comprises a cobalt catalyst. A polymer based oxygen scavenging resin tends to be used with such catalyst-based compounds, according to certain embodiments of the invention. In an embodiment of the invention, the oxygen scavenger layer 40 comprises transition metal catalyst ranging from about 0.1 wt % to about 1.5 wt %, from about 0.15 wt % to about 1 wt %, and from about 0.2 wt % to about 0.5 wt % all based upon the weight of the oxygen scavenger layer 40.

The oxygen scavenger layer 40 may also comprise photoinitiators, according to an embodiment of the invention. A photoinitiator or a blend of photoinitiators, according to certain embodiments of the invention, help to facilitate and control the initiation of the scavenging process.

In certain embodiments of the invention, oxygen scavenging compounds may also include catalysts that promote cross-linking of the polymer resins to promote oxygen scavenging. Such catalysts may include a Group I alkoxide or a Group IVB alkoxide, for example, that includes any one or more of di-butyl tin dilaurate, sodium methoxide, toluene sulfonic acid, a tetraalkyl titanate, tetrabutyl titanate, tetraisopropyl titanate, tetraethyl titanate, and titanium isopropoxide. According to certain embodiments of the invention, the oxygen scavenger layer 40 comprises any such one or more catalysts ranging from about 0.1 wt % to about 2 wt %, from about 0.5 wt % to about 1.8 wt %, from about 0.8 wt % to about 1.6 wt %, and from about 1 wt % to about 1.5 wt % all based upon the weight of the oxygen scavenger layer 40.

In some embodiments, the oxygen scavenger layer 40 may contain an antioxidant according to an embodiment of the invention. Suitable antioxidants may include 2,5-di-tert-butylhydroquinone, 2,6-di-tert-butyl-p-cresol, 4,4,'-thiobis (6-tert-butylphenol), 2,2'-methylene-bis(4-methyl-6-tert-butylphenol), octadecyl-3-(3',5'-di-tert-butyl-4'-hydroxyphenyl)propionate, 4,4'-thiobis(6-tertbutylphenol), 2-tert-butyl-6-(3-tert-butyl-2-hydroxy-5-methylbenzyl)-4-methylphenylacrylate, pentaerythritoltetrakis(3-laurylthiopropionate), 2, 6-di-(tert-butyl)-4-methylphenol (BHT), 2,2-methylenebis(6-tert-butyl-p-cresol), triphenyl phosphite, tris (nonylphenyl) phosphite, dilauryl thiodipropionate, or the like.

The amount of the antioxidant to be present in the oxygen scavenger layer 40 composition is readily determined through experimentation as appropriate, in view of the kinds and the contents of components of the resin composition, and the use and the storage conditions of the resin composition, and the like. In general, the amount of the antioxidant is typically from about 0.01% to 1% by weight, and in particular from about 0.02% to about 0.5% by weight, based on the total weight of the active oxygen barrier composition. If the amount of the antioxidant is too small, the reaction with oxygen may proceed extensively during storage or melt-kneading of the active oxygen barrier composition, so that the oxygen scavenging function may be lowered before the resin composition of the present invention is actually put to use. If the amount of the antioxidant is large, the reaction of the active oxygen barrier composition with oxygen can be inhibited, so that the oxygen scavenging function of the resin composition of the present invention will not be immediately active upon manufacture. In such cases, it may be desirable to further incorporate a photoinitiator into the composition and activate the composition at a later point in time with actinic radiation. Suitable photoinitiators and methods of triggering using actinic radiation are disclosed in U.S. Pat. Nos. 5,211,875; 6,139,770; 6,254,802; and 7,153,891, which are incorporated herein by reference in their entirety.

In an embodiment of the invention, the oxygen scavenger layer 40 comprises at least one of a transition metal catalyst, a catalyst that promotes cross-linking of the polymer resin, a naturally occurring antioxidant compound, and any combination thereof. In certain embodiments of the invention, the oxygen scavenger layer 40 comprises from about 0.1 wt % to about 2 wt %, from about 0.15 wt % to about 1.5 wt %, from about 0.2 wt % to about 1 wt %, or from about 0.25 wt % to about 0.5 wt % of the transition metal catalyst, each based upon the total weight of the oxygen scavenger layer 40. In certain embodiments of the invention, the oxygen scavenger layer 40 comprises from about 0.1 wt % to about 2 wt %, from about 0.2 wt % to about 1.75 wt %, from about 0.5 wt % to about 1.5 wt %, or from about 0.8 wt % to about 1.25 wt % of the catalyst that promotes cross-linking of the polymer resin, each based upon the total weight of the oxygen scavenger layer 40. In certain embodiments of the invention, the oxygen scavenger layer 40 comprises from about 0.1 wt % to about 2 wt %, from about 0.2 wt % to about 1.75 wt %, from about 0.5 wt % to about 1.5 wt %, or from about 0.8 wt % to about 1.25 wt % of the naturally occurring antioxidant compound, each based upon the total weight of the oxygen scavenger layer 40. In a preferred embodiment of the invention the oxygen scavenger layer 40 comprises a cobalt catalyst, tetraisopropyl titanate, titanium isopropoxide, α-tocopherol, and any combination thereof.

The bulk layer 50 may be configured to act as an odor causing VOC scavenger, and especially in combination with the barrier substrate layer 60, a barrier counterbalance to the barrier layer 30 to provide a means for better containing any odor causing VOC compound that may be generated, for example, allowing such compound an opportunity to be adsorbed, absorbed or reacted before such compound can be absorbed by the product surrounded by the packaging. Additionally, the bulk layer 50 will be configured to comprise the odor causing VOC scavengers according to the disclosure further provided herein.

The VOCs would eventually begin to permeate either or both barrier layers overtime. Thus, according to an embodiment of the invention, the bulk layer 50 aligned with the barrier substrate layer 60 is loaded with a blend of odor causing VOC scavengers. In an embodiment of the invention, the odor causing VOC scavengers comprise zeolites. In certain embodiments of the invention, zeolites having pore sizes ranging from about 1 to about 12 angstroms, from about 2 to about 11 angstroms, from about 3 to about 10 angstroms, or, preferably, from about 4 to about 9 angstroms are used as odor causing VOC scavengers. In yet other embodiments of the invention, zeolites having pore sizes greater than about 1 angstrom, greater than about 2 angstroms, greater than about 3 angstroms, or greater than about 4 angstroms are used as odor causing VOC scavengers.

In an embodiment of the invention, the bulk layer 50 and the barrier substrate layer 60 are bonded together. In certain embodiments of the invention, a polymer solvent based adhesive bonding agent is used to bond the bulk layer 50 and the barrier substrate layer 60 together. Such adhesives may vary depending upon the types of polymer resins used in the bulk layer 50 and the barrier substrate layer 60. For example, if the bulk layer 50 and the barrier substrate layer 60 have polyethylene based resins, the adhesive may include an aromatic isocyanate, polyol and ethyl acetate combination.

According to certain embodiments of the invention, the zeolites are blended with certain compounds to at least one or more of absorb and chemically react with the VOCs before such VOCs can penetrate the barrier layer and become absorbed by the packaged product. In an embodiment of the invention, the blended compounds comprise zinc oxide (ZnO), magnesium oxide (MgO), Abscents 3000 aluminosilicate based zeolite (linear formula $(SiO_2)_x(Al_2O_3)_y$), zeolite 13X, zeolite 5A, SYLOID® Al-1 silica gel desiccant offered by Grace Materials Technologies (Columbia, Md.), and any combination thereof. The blended compounds may also include zeolite 5A. Zeolite 13X is a more pure form of zeolite synthesized from natural zeolite utilizing other processing techniques. For example, natural zeolite may be processed using a hydrothermal method to prepare a synthetic zeolite. Typically, zeolite 13X is characterized by the mole ratio of $SiO_2$ to $Al_2O_3$, which ranges from greater than about 2 up to about 3.

Zeolite 13X also possesses an appreciable amount of $Na_2O$, up to about 15% by weight but typically no more than about 20% by weight. Smaller amounts of impurities such as anatase ($TiO_2$), hematite ($Fe_2O_3$), periclas (MgO), calcium oxide (CaO) and potassium oxide ($K_2O$) may also be present.

While SYLOID® Al-1 is conventionally recognized in the art as a moisture absorber or a matting agent for paints, the inventors have conceived that SYLOID® Al-1 performs very well in scavenging VOCs.

In an embodiment of the invention, a blend of different odor causing VOC scavengers can be used in the same article. In certain embodiments of the invention, the odor causing VOC scavenger is disposed closer to the contents of the package, which can be food or any oxygen-sensitive product, than the oxygen scavenger. In other embodiments of the invention, the odor causing VOC scavenger is disposed "outside of" the oxygen scavenger, such that the oxygen scavenger containing layer is disposed closer to the contents of a package made from the film, than the layer containing odor causing VOC scavengers. As further described herein, the odor causing VOC scavenger may be disposed on both sides of the oxygen scavenger.

In an embodiment of the invention, the bulk layer comprises a zeolite formulation comprising at least one or more of zeolite 5A, zeolite 13X, Abscents 3000, Magnesium Oxide, Zinc Oxide, and SYLOID® Al-1. In certain embodiments of the invention, the zeolite formulation comprises at least about 0.5 wt %, at least about 1 wt %, at least about 2 wt %, at least about 2.25 wt %, at least about 2.5 wt %, at least about 3 wt %, at least about 4 wt %, at least about 5 wt %, at least about 10 wt %, at least about 15 wt %, at least about 20 wt %, and any range between these values based upon the total weight of the bulk layer. In an embodiment of the invention, the bulk layer comprises zeolite 13X having a range of from about 1 wt % to about 20 wt %, from about 0.5 wt % to about 7 wt %, from about 0.8 wt % to about 6 wt %, and from about 1 wt % to about 5 wt % all based upon the total weight of the bulk layer. In a certain embodiment of the invention, the bulk layer comprises zeolite 13X having a range of from about 1.5 wt % to about 4.5 wt % based upon the total weight of the bulk layer. In other embodiments of the invention, a scavenger layer comprises zeolite 13X having a concentration ranging from about 5 wt % to about 15 wt % based on the total weight of the scavenger layer where it is present. In further embodiments of the invention, a scavenger layer comprises zeolite 13X having a concentration ranging from about 3 wt % to about 4 wt % based on the total weight of the scavenger layer where it is present. The scavenger layer may be an odor scavenger layer, an oxygen scavenger layer, or combinations thereof.

In an embodiment of the invention, the bulk layer comprises zeolite 5A having a range of from about 0.5 wt % to about 20 wt %, from about 1 wt % to about 20 wt %, from about 1 wt % to about 15 wt %, from about 1 wt % to about 10 wt %, from about 1 wt % to about 5 wt % all based upon the total weight of the bulk layer. In an embodiment of the invention, the bulk layer comprises zeolite 5A having a range of from about 1 wt % to about 5 wt % based upon the total weight of the bulk layer.

In another embodiment of the invention, the bulk layer comprises Abscents 3000 having a range of from about 0.04 wt % to about 5 wt %, about 0.01 wt % to about 2 wt %, from about 0.02 wt % to about 1 wt %, from about 0.5 wt % to about 0.7 wt %, and from about 0.04 wt % to about 0.5 wt % all based upon the total weight of the bulk layer. In a certain embodiment of the invention, the bulk layer comprises Abscents 3000 having a range of from about 0.05 wt % to about 0.25 wt % based upon the total weight of the bulk layer.

In yet another embodiment of the invention, the bulk layer comprises MgO having a range of from about 0.08 wt % to about 6 wt %, about 0.01 wt % to about 2 wt %, about 0.02 wt % to about 1 wt %, about 0.08 wt % to about 0.5 wt %, and about 0.65 wt % to about 0.95 wt % all based upon the total weight of the bulk layer. In a certain embodiment of the invention, the bulk layer comprise MgO having a range of from about 0.1 wt % to about 0.25 wt % based upon the total weight of the bulk layer.

In still yet another embodiment of the invention, the bulk layer comprises ZnO having a range of from about 0.01 wt % to about 2 wt %, from about 0.02 wt % to about 1 wt %, and from about 0.08 wt % to about 0.5 wt % all based upon the total weight of the bulk layer. In a certain embodiment of the invention, the bulk layer comprises ZnO having a range of from about 0.1 wt % to about 0.25 wt % based upon the total weight of the bulk layer. In other embodiments, the bulk layer may comprise ZnO having a range of from about 0.9 wt % to about 1.1 wt % based upon the total weight of the bulk layer.

In even still yet another embodiment of the invention, the bulk layer comprises SYLOID® Al-1 having a range of from about 0.01 wt % to about 0.5 wt %, about 0.04 wt % to about 5 wt %, about 0.03 wt % to about 0.4 wt %, and about 0.04 wt % to about 0.25 wt % all based upon the total weight of the bulk layer. In other embodiments, the bulk layer comprises SYLOID® Al-1 having a range of from about 0.05 wt % to about 0.2 wt % based upon the total weight of the bulk layer. In a certain embodiment of the invention, the bulk layer comprises SYLOID® Al-1 having a range of from about 0.05 wt % to about 0.15 wt % based upon the total weight of the bulk layer.

In an embodiment of the invention, the bulk layer comprises a zeolite formulation comprising zeolite 13X having a range of from about 1 wt % to about 5 wt %, preferably about 1.5 wt % to about 4.5 wt %; Abscents 3000 having a range of from about 0.04 wt % to about 0.5 wt %, preferably about 0.05 wt % to about 0.25 wt %; MgO having a range of from about 0.08 wt % to about 0.5 wt %, preferably about 0.1 wt % to about 0.25 wt %; ZnO having a range of from about 0.08 wt % to about 0.5 wt %, preferably about 0.1 wt % to about 0.25 wt %; and SYLOID® Al-1 having a range of from about 0.04 wt % to about 0.25 wt %, preferably about 0.05 wt % to about 0.15 wt % with each wt % being based upon the total weight of the bulk layer.

In some embodiments, the bulk layer may comprise a zeolite formulation, wherein the zeolite formulation has a range of from about 0.5 wt % to about 20 wt % of zeolite 5A, about 1 wt % to about 20 wt % of zeolite 13X, a range of from about 0.04 wt % to about 5 wt % of Abscents 3000, a range of from about 0.08 wt % to about 6 wt % of MgO, a range of from about 0.08 wt % to about 5 wt % of ZnO, and a range of from about 0.04 wt % to about 5 wt % of SYLOID® Al-1.

In other embodiments, the bulk layer may comprise a zeolite formulation, wherein the zeolite formulation has a range of from about 3 wt % to about 4 wt % of zeolite 13X, a range of from about 0.5 wt % to about 0.7 wt % Abscents 3000, a range of from about 0.65 wt % to about 0.95 wt % of ZnO, from about 0.9 wt % to about 1.1 wt % MgO, and from about 0.05 wt % to about 0.2 wt % of SYLOID® Al-1 based upon at total weight of the odor scavenger layer.

According to yet another embodiment of the invention, the zeolite may be disposed in the same layer or layers as the oxygen scavenging material. A preferred blend of oxygen scavenging and zeolite in such a blend layer is between about 95% by weight and about 99.5% by weight oxygen scavenger, and between about 0.5% by weight and about 5% by weight zeolite. Any suitable polymeric materials may be employed in films containing the zeolite(s), and are not limited to those listed herein. The amount of zeolite used in a film of the present invention is preferably between about 0.1% and about 5% of the layer in which it is disposed. In certain other embodiments of the invention, in particular where optics are not a critical feature of the package, such as opaque films or gaskets for containers, higher amounts of zeolite(s) greater than about 5% by weight, for example, may be disposed in the film.

The extent of VOCs generated and removed in a system may be determined using, for example, a gas chromatography mass spectrometry (GC/O/MS) instrument. According to an embodiment of the invention, a film configured according to FIG. 1 may reduce VOCs leading to detectable odors by at least about 88%, at least about 90%, at least about 91%, at least about 93%, at least about 95%, at least about 97%, at least about 98%, or at least about 99%. In an embodiment of the invention, the film substantially reduces VOCs leading to detectable odors approaching about 100%.

Generally, the oxygen scavenger layer has an oxygen absorption rate that is at least about 0.01 ml/(g-day), while the bulk layer has an odor causing VOC absorption rate of at least about 0.01 ml/(g-day).

According to an embodiment of the invention, the permeability rate of the barrier layer may be increased by blending a non-barrier polymer with a cyclic olefin copolymer (COC) to achieve the desired odor causing VOC scavenging rate in the bulk layer required for the packaging material. Without intending to be bound by theory, comparably, in the event such a barrier is not included, barrier scavenging times are reduced to about four to about six days. Thus, the barrier may increase scavenging time on the order of about 15%, on the order of about 20%, on the order of about 33%, on the order of about 50%, on the order of about 67%, on the order of about 75%, on the order of about 100%, on the order of about 125% or on the order of about 150%.

In an aspect of the invention, the oxygen scavenging layer includes an oxygen scavenging moiety that intercepts and binds with oxygen passing through the film to thereby maintain a low oxygen atmosphere in the interior of a package surrounded by the film. Over a period of time however, the capacity of the oxygen scavenging moiety to intercept and bind with oxygen may become diminished so that the barrier properties of the layer become diminished. In some cases, the reduction in capacity can result in the oxygen scavenger layer having a significant reduction in oxygen barrier properties, which may result in the film having poor oxygen barrier properties. The presence of more than one barrier layer in the surrounding film helps to maintain a low oxygen transmission rate through the film even after the capacity of one of the barrier layers has been exhausted.

According to certain embodiments of the invention, the barrier layer may additionally include an odor scavenging moiety that intercepts and binds with odor creating molecules that may otherwise pass through the film and to thereby maintain a lower concentration of odor creating molecules in the interior surrounded by the film. Over a period of time however, the capacity of the odor causing VOC scavenging moiety to intercept and bind with odor creating molecules may become diminished so that the barrier properties of the layer become diminished. In some cases, the reduction in capacity can result in the barrier layer having a significant reduction in odor molecule barrier properties, which may result in the film having poor properties for scavenging odor creating molecules. The presence of more than one such barrier layer in the surrounding film helps to maintain a low odor creating molecule transmission rate through the film even after the capacity of one of the barrier layers has been reduced or exhausted.

FIG. 2 is a cross-sectional side view of a film that is accordance with another aspect of the present invention having odor causing scavenger layer and a blocking layer. The film 110 includes a sealant layer 120, a bulk layer 150, and a barrier layer 160. The film 110 is configured to block odors from the package contents and during the shelf life of the product. According to an embodiment of the invention, the film may be configured to additionally scavenge $H_2S$ and other byproducts of a high pressure process (HPP) used for the elimination of harmful bacteria. When the package utilizing film 110 is opened, the selected scavengers of the bulk layer 150 significantly reduces the offensive smell that could otherwise be associated with the product.

The films of the present invention may be used in a wide variety of packaging applications. For example, in the production of bags, pouches, lidstocks, vacuum packaging, vacuum skin packaging, vertical and horizontal form fill packaging, and the like. For example, the films of the present invention may be used in food packaging. In some embodiments, the films of the present inventions may be used in meat packaging, for example poultry packaging. In further embodiments, the films of the present inventions may be used liquid food packaging, for example, milk. In some embodiments, a surface of the film may comprise an inner surface of a package made from the film and an outer abuse layer for the package. For example, in one embodiment, the sealant layer may comprise a polymeric material that is capable of adhering to another component of a package, such as a tray, one or more additional sheets of film, or to itself to form a package having an interior space in which an oxygen and odor sensitive product can be disposed. In one particular embodiment, the surface of the film can be adhered to itself to form a bag or pouch. In one embodiment, the sealant layer may comprise a heat sealable polymeric material.

In one embodiment of the invention, the bulk layer 150 comprises a composition that is a blend of a thermoplastic resin (A), an oxygen barrier polymer (B), an oxygen scavenging moiety (C), and an odor scavenging moiety (D). In certain embodiments of the invention, the oxygen scavenging moiety (C) and the odor scavenging moiety (D) may be the same. In some embodiments, the blend may also include a compatibilizer (E). The oxygen barrier polymer will typically comprise 70 to 99% by weight of the composition, and the thermoplastic resin will typically comprise from about 1 to 30 weight % of the polymeric portion of the composition.

When a compatibilizer is used, it generally comprises from about 0.1 wt % to about 29 wt % of the total polymeric portion of the composition. Suitable active oxygen barrier compositions are described in greater detail in US Patent Publication Nos. 2006/0281882 and 2005/0153087, the contents of which are incorporated herein by reference in their entirety to the extent they are consistent with the teachings herein.

The barrier layer 160 may have an oxygen permeability of 50 cc·20 μm/(m2-day-atm) or less at 65% RH and 20° C. according to an embodiment of the invention. In particular, the barrier layer 160 may have an oxygen permeability of 5 cc·20 μm/(m2-day-atm) or less, such as 0.5 cc·20 μm/(m2-day-atm) or less at 65% RH and 20° C. according to another embodiment of the invention, and more particularly, the active oxygen barrier layer will have and oxygen permeability of 0.1 cc·20 μm/(m2-day-atm) or less at 65% RH and 20° C.

The oxygen barrier polymer generally may have an oxygen permeability of 500 cc·20 μm/(m2-day-atm) or less at 65% RH and 20° C. In one embodiment, the oxygen barrier polymer may be selected from the group consisting of polyvinyl alcohol, ethylene vinyl alcohol copolymer, polyamide, polyvinyl chloride and its copolymers, polyvinylidene dichloride and its copolymers, and polyacrylonitrile and its copolymers.

Certain thermoplastic resins that may be useful in the present invention are described more fully in US Patent Publication No. 2014/0314920, the contents of which are incorporated herein by reference in their entirety.

In one embodiment, the thermoplastic resin comprises at least one resin selected from the group consisting of polybutadiene, polyisoprene, polychloroprene, polyoctenamer and polyoctenylene, and combinations thereof. In one particular embodiment, the thermoplastic resin is at least one resin selected from the group consisting of polybutadiene and polyoctenylene, and combinations thereof, such as polyoctenylene.

In one embodiment of the invention, the oxygen absorption rate of the barrier layer is at least about 0.01 ml/(g-day).

In an embodiment of the invention, the barrier polymer is ethylene vinyl alcohol copolymer having an ethylene content from about 5 mole percent to about 60 mole percent and a degree of saponification of about 90% or more. More preferably, the ethylene vinyl alcohol copolymer has an ethylene content between 27 mol % and 60 mol %, and in particular from about 30 mol % to 44 mol %, for example, 32 mol %. The amount of EVOH copolymer may be between about 70 wt % and 99 wt %, based on the total weight of the barrier layer, according to an embodiment of the invention. In one embodiment, the amount of EVOH copolymer is from about 85 wt % to 95 wt %, and in particular about 90 weight percent, based on the total weight of the barrier layer.

When the oxygen absorption resin composition of the present invention contains an oxygen barrier polymer and a compatibilizer as resin components, in addition to the thermoplastic resin, it is preferable that the thermoplastic resin is contained in a ratio of 1 wt % to 29.9 wt %, the oxygen barrier polymer is contained in a ratio of 70 wt % to 98.9 wt %, and the compatibilizer is contained in a ratio of about 0.1 wt % to 29 wt %, when the total weight of the thermoplastic resin, the oxygen barrier polymer and the compatibilizer is 100 wt %. If the content of the oxygen barrier polymer is less than 70 wt %, the gas barrier properties of the resin composition with respect to oxygen gas or carbon dioxide gas may deteriorate. On the other hand, if the content of the oxygen barrier polymer is more than 98.9 wt %, the content of the thermoplastic resin and the compatibilizer is small, so that the oxygen scavenging function may deteriorate, and the stability of the morphology of the entire resin composition may be impaired. In one embodiment, the content of the thermoplastic resin is more than about 2 wt % to about 19.5 wt %, and, in particular, from about 3 wt % to about 14 wt %. The content of the oxygen barrier polymer is generally from about 80 wt % to about 97.5 wt %, and, in particular, from about 85 wt % to about 96 wt %. The content of the compatibilizer is typically about 0.5 wt % to 18 wt %, and in particular from about 1 wt % to about 12 wt %.

Other polymeric compositions that may be used in the active oxygen scavenger layer may include barrier polymers having an unsaturated organic moiety blended therein, such as nylons including both amorphous and semi-crystalline nylons.

An aspect of the invention provides a method for scavenging odor causing VOC compounds comprising the steps of containing the VOC compounds between an inner barrier layer and an outer barrier layer, allowing oxygen to permeate the inner barrier layer, scavenging oxygen at least in an oxygen scavenger layer, and scavenging the VOC compounds in a bulk layer. In an embodiment of the invention, the method also includes scavenging at least some of the odor causing VOC compounds in the oxygen scavenger layer.

In an embodiment of the invention, the bulk layer comprises a zeolite formulation comprising zeolite 13X having a range of from about 1 wt % to about 5 wt %, preferably about 1.5 wt % to about 4.5 wt %; Abscents 3000 having a range of from about 0.04 wt % to about 0.5 wt %, preferably about 0.05 wt % to about 0.25 wt %; MgO having a range of from about 0.08 wt % to about 0.5 wt %, preferably about 0.1 wt % to about 0.25 wt %; ZnO having a range of from about 0.08 wt % to about 0.5 wt %, preferably about 0.1 wt % to about 0.25 wt %; and SYLOID® Al-1 having a range of from about 0.04 wt % to about 0.25 wt %, preferably about 0.05 wt % to about 0.15 wt % with each wt % being based upon the total weight of the bulk layer. In some embodiments, the bulk layer comprises a zeolite formulation comprising zeolite 5A having a range of from about 1 wt % to about 15 wt % based upon the total weight of the bulk layer. In other embodiments, the bulk layer comprises a zeolite formulation comprising zeolite 5A having 12.5 wt % based upon the total weight of the bulk layer.

In some embodiments, the bulk layer may comprise a zeolite formulation, wherein the zeolite formulation has a range of from about 0.5 wt % to about 20 wt % of zeolite 5A, about 1 wt % to about 20 wt % of zeolite 13X, a range of from about 0.04 wt % to about 5 wt % of Abscents 3000, a range of from about 0.08 wt % to about 6 wt % of MgO, a range of from about 0.08 wt % to about 5 wt % of ZnO, and a range of from about 0.04 wt % to about 5 wt % of SYLOID® Al-1.

In other embodiments, the bulk layer may comprise a zeolite formulation, wherein the zeolite formulation has a range of from about 3 wt % to about 4 wt % of zeolite 13X, a range of from about 0.5 wt % to about 0.7 wt % Abscents 3000, a range of from about 0.65 wt % to about 0.95 wt % of ZnO, from about 0.9 wt % to about 1.1 wt % MgO, and from about 0.05 wt % to about 0.2 wt % of SYLOID® Al-1 based upon at total weight of the odor scavenger layer.

In an aspect of the invention, the film does not include odor causing VOC barrier layers for the purpose of confining such VOCs to a region of the film where they can be scavenged. Generally, such a film comprises a sealant (e.g., an outside skin layer), an odor scavenger arrangement (e.g., an odor scavenger layer), and an oxygen barrier (one or more layers, as needed, to provide the oxygen barrier properties). One or more tie layers may be included to interconnect any of the layers in the film as needed.

FIG. 3 is a cross-sectional side view of a film in accordance with this aspect of the present invention having an odor causing scavenger layer but without a blocking component for confining such VOCs to a certain region of the film. The film 210 includes a first tie layer 220, a film strengthening layer 230, an oxygen barrier 240, a second tie layer 250, an odor scavenger layer 260, and a skin layer 270. Optionally, but as shown in this exemplary embodiment, another film strengthening barrier 230' may be between the oxygen barrier 240 and the second tie layer 250. The film 210 is configured to block odors from the package contents and during the shelf life of the product. According to an embodiment of the invention, the film may be configured to additionally scavenge $H_2S$ and other byproducts of a high pressure process (HPP) used for the elimination of harmful bacteria. When the package utilizing film 210 is opened, the selected scavengers of the odor scavenger layer 260 significantly reduces the offensive odor and possibly taste that could otherwise be associated with the product. While FIG. 3 is one exemplary embodiment of this aspect of the invention, other embodiments whereby the layers of the film are repositioned are possible. A person of ordinary skill in the art would understand this based upon the teachings provided herein.

A tie layer, such as first tie layer 220 and second tie layer 250, is used to adhere a layer to the film. In certain embodiments of the invention, the first tie layer 220 and the second tie layer 250 are configured to provide enhanced adhesion properties. In an embodiment of the invention, the tie layer comprises a grafted copolymer. In an embodiment of the invention, either tie layer 220 and/or 250 may comprise a functionalized polymer, for example, a functionalized polypropylene such as, for instance, a maleic anhydride-grafted isotactic polypropylene. In certain embodiments of the invention, either or both of the tie layers 220 and/or 250 comprise a maleic anhydride modified ethylene and vinyl acetate copolymer. Further pursuant to this embodiment, the copolymer may comprise up to about 5 mol %, up to about 10 mol %, up to about 11 mol %, up to about 12 mol % up to about 13 mol %, up to about 15 mol %, or up to about 20 mol % of vinyl acetate.

The film strengthening layer 230 and/or another film strengthening layer 230' may comprise a polymer that provides to the film 210 strength allowing such a film to be more flexible, according to an embodiment of the invention. In an embodiment of the invention, the film strengthening layer 230 and/or another film strengthening layer 230' comprises a polyamide or a nylon. In certain embodiments of the invention, the film strengthening layer 230 and/or another film strengthening layer 230' preferentially comprises a polycaprolactam or a nylon 6. In certain other embodiments of the invention, the film strengthening layer 230 and/or another film strengthening layer 230' may additionally comprise a colorant. For example, a white colorant may be used to impart a better overall color to the film.

The oxygen barrier layer 240 comprises a resin, according to an embodiment of the invention. In certain embodiments of the invention, the oxygen barrier layer 240 comprises a thermoplastic resin having carbon-carbon double bonds. Further pursuant to this embodiment, the carbon-carbon double bonds are primarily present in the main chain of the polymer defining the resin. In certain embodiments of the invention, the oxygen barrier layer 240 may additionally comprise a transition metal salt. The transition metal salt may include at least one metal salt selected from the group consisting of an iron salt, a nickel salt, a copper salt, a manganese salt, a cobalt salt, and any combination thereof. In yet other embodiments of the invention, the oxygen barrier layer 240 comprises a polymer known in the art as an oxygen barrier polymer specifically developed to reduce the movement of oxygen across the barrier. In certain embodiments of the invention, the oxygen barrier layer 240 comprises a compatibilizer. Compatibilizer compounds may include those compounds that act as antioxidants, heat stabilizers, and the like. In preferred embodiments of the invention, the oxygen barrier layer 240 comprises a poly (ethylene/vinyl alcohol) (EVOH) copolymer. In certain embodiments of the invention, the EVOH copolymer comprises from about 15 mol % to about 55 mol % ethylene, from about 20 mol % to about 50 mol % ethylene, from about 25 mol % to about 45 mol % ethylene, or from about 30 mol % to about 40 mol % ethylene.

The odor scavenger layer 260 may include any composition and concentration of the scavenger compounds disclosed herein. In certain embodiments of the invention, the odor scavenger layer 260 comprises from about 1 wt % to about 20 wt %, 0.1 wt % to about 7 wt %, from about 0.5 wt % to about 6.5 wt %, from about 1 wt % to about 6 wt %, from about 1 wt % to about 5 wt %, from about 2 wt % to about 5 wt %, or from about 3 wt % to about 4 wt % of zeolite 13X based upon the total weight of the odor scavenger layer.

In other embodiments, odor scavenger layer 260 may have about 0.5 wt % to about 20 wt % of zeolite 5A, about 1 wt % to about 15 wt % of zeolite 5A, about 1 wt % to about 5 wt % of zeolite 5A based upon the total weight of the odor scavenger layer. In further embodiments, odor scavenger layer 260 may have 12.5 wt % of zeolite 5A based upon the total weight of the odor scavenger layer.

In certain embodiments of the invention, the odor scavenger layer 260 comprises from about 0.04 wt % to about 5 wt %, about 0.1 wt % to about 1 wt %, from about 0.3 wt % to about 0.9 wt %, or from about 0.5 wt % to about 0.7 wt % of Abscents 3000 based upon the total weight of the odor scavenger layer 260. In certain embodiments of the invention, the odor scavenger layer 260 comprises about 0.6 wt % of Abscents 3000 based upon the total weight of the odor scavenger layer 260.

In certain embodiments of the invention, odor scavenger layer 260 comprises from about 0.08 wt % to about 5 wt %, about 0.1 wt % to about 1.5 wt %, from about 0.3 wt % to about 1.2 wt %, from about 0.5 wt % to about 1 wt %, from about 0.6 wt % to about 0.9 wt %, or from about 0.65 wt % to about 0.85 wt % of ZnO based upon the total weight of the odor scavenger layer 260. In some embodiments of the invention, the odor scavenger layer 260 comprises about 0.9 wt % to about 1.1 wt % of ZnO based upon the total weight of the odor scavenger layer 260. In certain embodiments of the invention, the odor scavenger layer 260 comprises about 0.75 wt % of ZnO based upon the total weight of the odor scavenger layer 260.

In certain embodiments of the invention, odor scavenger layer 260 comprises from about 0.08 wt % to about 6 wt %, from about 0.1 wt % to about 2 wt %, from about 0.3 wt % to about 1.7 wt %, from about 0.5 wt % to about 1.5 wt %, from about 0.8 wt % to about 1.2 wt %, or from about 0.65 wt % to about 0.95 wt % of MgO based upon the total weight of the odor scavenger layer 260. In certain embodiments of the invention, the odor scavenger layer 260 comprises about 1 wt % of MgO based upon the total weight of the odor scavenger layer 260.

The odor scavenger layer 260 may, according to certain embodiments of the invention, comprise a zeolite formulation comprising at least one of zeolite 5A, zeolite 13X, Abscents 3000, ZnO and MgO. The zeolite formulation may have concentrations of these compounds as further defined herein.

In an embodiment of the invention, the skin layer 270 comprises a polyolefin. The polyolefin may be selected from polypropylene homopolymer, a high density polyethylene, a medium density polyethylene, a linear low density polyethylene, a low density polyethylene, an ethylene-propylene copolymer, a propylene-butylene copolymer, an ethylene-propylene-butylene terpolymer, and any combination thereof. In certain embodiments of the invention, the skin layer 270 comprises a polyethylene, preferably a linear low density polyethylene and a copolymer. Further pursuant to this embodiment, the skin layer 270 may comprise an ethylene-propylene copolymer, a propylene-butylene copolymer, an ethylene-pentylene, an ethylene-hexane copolymer, an ethylene-heptene copolymer, or an ethylene-octene copolymer. In an embodiment of the invention, the skin layer 270 may comprise coefficient reducing compounds. In certain embodiments of the invention, the skin layer 270 comprises a silica-based compound. Further pursuant to this embodiment of the invention, the silica-based compound may be from about 0.1 wt % to about 2.5 wt %, from about 0.5 wt % to about 2 wt %, or from about 1 wt % to about 1.5 wt % based upon the total weight of the skin layer 270. In certain embodiments of the invention, the skin layer 270 may additionally comprise a fluoropolymer. Further pursuant to this embodiment, the fluoropolymer may be from about 0.01 wt % to about 0.1 wt %, from about 0.03 wt % to about 0.09 wt %, from about 0.04 wt % to about 0.08 wt %, or from about 0.05 wt % to about 0.07 wt % based upon the total weight of the skin layer 270.

FIG. 4 is a cross-sectional side view of a film that is in accordance with an embodiment of the present invention having odor causing VOC scavengers disposed in another functional layer. The film 310 is structured such that three of the inner and outer layers are mirror images. The film 310 includes sealant layers 370, 370'; tie layers 320, 320'; film strengthening layers 330, 330'; and an oxygen barrier 340, 340'. Sealant layers 370, 370' may be similar to the specifications for the skin layer 270 further described herein, according to an embodiment of the invention. Tie layers 320, 320' may be similar to the specifications for the first tie layer 220 and/or second tie layer 250 further described herein, according to an embodiment of the invention. Film strengthening layers 330, 330' may be similar to the specifications for the film strengthening layer 230 and/or another film strengthening layer 230' further described herein, according to an embodiment of the invention. In some embodiments, the film 310 may not have an oxygen barrier 340.

In an embodiment of the invention, odor causing VOC scavengers through one zeolite as described herein or even a zeolite formulation as described herein may be included in the sealant layer 370. Further pursuant to this embodiment, the sealant layer 370 is the layer intended to be closest to the packaged product the film 310 encompasses. In another embodiment of the invention, odor causing VOC scavengers through one zeolite as described herein or even a zeolite formulation as described herein may be included in the tie layer 320. Further pursuant to this embodiment, the tie layer 320 is the layer intended to be the tie layer closest to the packaged product the film 310 encompasses.

A first embodiment, wherein a film comprises:
a bulk layer for scavenging a volatile organoleptic compound (VOC);
an oxygen scavenger layer;
an interior barrier layer; and
a barrier substrate layer,
wherein the bulk layer and the oxygen scavenger layer are disposed between the interior barrier layer and the barrier substrate layer, and the interior barrier layer and the barrier substrate layer are configured to be permeable to oxygen but act as barriers to the VOC.

The first embodiment, wherein the VOC is odor causing.

The first embodiment, wherein the interior barrier layer acts as a barrier to the VOC having a molecular weight of greater than about 40.

The first embodiment, wherein the bulk layer comprises zeolite 13X.

The first embodiment, wherein the zeolite 13X ranges from about 5 wt % to about 25 wt % based on the total weight of the bulk layer.

The first embodiment, wherein the bulk layer comprises zeolite 5A.

The first embodiment, wherein the bulk layer comprises SYLOID® Al-1.

The first embodiment, wherein the SYLOID® Al-1 is greater than about 5 wt % based upon the total weight of the bulk layer.

The first embodiment, wherein the bulk layer comprises zeolite 13X and SYLOID® Al-1.

The first embodiment, wherein the bulk layer comprises a zeolite formulation comprising at least one member selected from the group consisting of zeolite 5A, zeolite 13X, Abscents 3000, MgO, ZnO and SYLOID® Al-1.

The zeolite formulation having a range of from about 0.5 wt % to about 20 wt % of zeolite 5A, about 1 wt % to about 20 wt % of zeolite 13X; a range of from about 0.04 wt % to about 5 wt % of Abscents 3000; a range of from about 0.08 wt % to about 6 wt % of MgO; a range of from about 0.08 wt % to about 5 wt % of ZnO; a range of from about 0.04 wt % to about 4 wt % of SYLOID® Al-1 based upon the total weight of the bulk layer.

The zeolite formulation having a range of from about 1.5 wt % to about 4.5 wt % of zeolite 13X; a range of from about 0.05 wt % to about 0.25 wt % of Abscents 3000; a range of from about 0.1 wt % to about 0.25 wt % of MgO; a range of from about 0.1 wt % to about 0.25 wt % of ZnO; and a range of from about 0.05 wt % to about 0.15 wt % of SYLOID® Al-1 based upon the total weight of the bulk layer.

The first embodiment, wherein at least about 88% of the VOC is removed.

The first embodiment, wherein the oxygen scavenger layer comprises based upon a total weight of the oxygen scavenger layer:
from about 0.1 wt % to about 2 wt % of a cobalt catalyst;
from about 0.1 wt % to about 2 wt % of at least one of tetraisopropyl titanate and titanium isopropoxide; and
from about 0.1 wt % to about 2 wt % of a-tocopherol.

The first embodiment, wherein the barrier substrate layer comprises a polyethylene terephthalate.

The first embodiment, wherein the barrier substrate layer is coated with an aluminum oxide.

The first embodiment, wherein the film is used to package a food product.

The first embodiment, wherein the food product is in liquid form.

A second embodiment, wherein a method for scavenging an odor causing VOC compound comprises:
containing the VOC compounds between an inner barrier layer and an outer barrier layer,
allowing oxygen to permeate the inner barrier layer,
scavenging oxygen at least in an oxygen scavenger layer, and
scavenging the VOC compound in a bulk layer.

The second embodiment, additionally comprising scavenging at least some of the odor causing VOC compound in the oxygen scavenger layer.

The second embodiment, wherein the bulk layer comprises a zeolite formulation having, based upon a total weight of the bulk layer, a range of from about 0.5 wt % to about 20 wt % of zeolite 5A, about 1 wt % to about 20 wt % of zeolite 13X, a range of from about 0.04 wt % to about 5 wt % of Abscents 3000, a range of from about 0.08 wt % to about 6 wt % of MgO, a range of from about 0.08 wt % to about 5 wt % of ZnO, and a range of from about 0.04 wt % to about 5 wt % of SYLOID® Al-1.

The second embodiment, wherein the bulk layer comprises a zeolite formulation having, based upon a total weight of the bulk layer, a range of from about 1.5 wt % to about 4.5 wt % of zeolite 13X, a range of from about 0.05 wt % to about 0.25 wt % of Abscents 3000, a range of from about 0.1 wt % to about 0.25 wt % of MgO, a range of from about 0.1 wt % to about 0.25 wt % of ZnO, and a range of from about 0.05 wt % to about 0.15 wt % of SYLOID® Al-1.

The second embodiment, wherein the oxygen scavenger layer comprises based upon a total weight of the oxygen scavenger layer:
from about 0.1 wt % to about 2 wt % of a cobalt catalyst;
from about 0.1 wt % to about 2 wt % of at least one of tetraisopropyl titanate and titanium isopropoxide; and
from about 0.1 wt % to about 2 wt % of a-tocopherol.

Testing Method

A special procedure was developed using an olfactometry (sniffer) port GC/O/MS to screen scavengers. The sniffer port was used to identify only VOCs resulting in detectable odors in order to manage the type and quantity of VOCs targeted for reduction or even elimination. Each molecule was manually identified on the chromatogram at the point of detection. Some of the common molecules found in every test were then spiked into the GC at known quantities to arrive at a qualitative and quantitative result allowing optimization of specific scavengers targeting specific molecules.

EXAMPLES

Various examples of the inventive subject matter include various embodiments of oxygen scavenging layers and odor scavenger layers. Specific examples of the inventive concept will now be described. The examples that follow are provided only for illustrative purposes only.

Example 1

Table 1 identifies the volatile organoleptic compounds (VOCs) that were found in an oxygen scavenging film triggered at 100 kilogray (kGy) absorbed dose for 5310 which had Abscents 3000 in the film. These VOCs are from the film after cross-linking was triggered and no food product was used during the testing.

Table 2 shows the ability of four separate odor barrier masterbatches to remove odor causing VOCs. As shown in Table 2, Zeolite 13X removes the greatest number of odor causing VOCs or a total of 88%.

Table 2 shows that, individually, SYLOID® Al-1 scavenged 90% of the detectable VOCs leading to odors while zeolite 13X scavenged 88%. Abscents 3000, MgO and ZnO scavenged 66%, 66% and 46%, respectively, of the detectable VOCs leading to odors.

TABLE 1

VOCs in Triggered (100 kGy) Oxygen Scavenging Film without Odor Causing VOC Scavengers

| VOC | MW | Formula | Odor Descriptor |
|---|---|---|---|
| acetaldehyde | 44.05 | $C_2H_{14}O$ | pungent, fruity |
| acetic acid | 60.05 | $C_2H_{14}O_2$ | sour vinegar |
| methyl acrylate | 86.09 | $C_4H_{16}O_2$ | pungent, bitter |
| benzaldehyde | 106.12 | $C_7H_6O$ | nutty |
| bicyclo[4,1,0]hept-2-ene | 94.08 | $C_7H_{10}$ | floral |
| 2-butene | 56.106 | $C_4H_8$ | slightly aromatic |
| 2-butenal | 74.122 | $C_4H_6O$ | musty, green |
| butanal | 72.11 | $C_4H_8OH$ | unpleasant rancid/sweet odor |
| 2-butanone | 72.1 | $C_4H_8O$ | sweet, butterscotch, MKE |
| 2-butanol | 74.122 | $C_4H_8OH$ | strong pleasant odor, fruity |
| 2-buten-1-ol | 86.13 | $C_5H_{10}O$ | irritant, woody |
| cyclopentanone | 84.12 | $C_5H_8O$ | minty, sweet |
| 1-decene | 140.27 | $C_{10}H_{20}$ | floral |
| furan | 68.07 | $C_4H_{14}O$ | nutty |
| 3-ethyl-2-hexene | 112.213 | $C_8H_{16}$ | hydrocarbon, sweet |
| 1,3-cycloheptadiene | 94.1543 | $C_7H_{10}$ | piney |
| 3-cyclohexenylmethanol | 126.196 | $C8H_{14}O$ | earthy |
| 3-cyclohexene-1-carboxaldehyde | 110.15 | $C_6H_9CHO$ | oily to sweet |
| 2,4-hexadiene | 82.14 | $C_6H_{10}$ | buttery |
| heptanal | 114.185 | $C_7H_{14}O$ | strong fruity odor |

TABLE 1-continued

VOCs in Triggered (100 kGy) Oxygen Scavenging Film without Odor Causing VOC Scavengers

| VOC | MW | Formula | Odor Descriptor |
|---|---|---|---|
| 2-heptanaone | 114.185 | $C_7H_{14}O$ | fruity |
| 1,2-heptadiene | 96.17 | $C_7H_{12}$ | earthy |
| hexanal | 100.159 | $C_6H_{12}O$ | unpleasant odor |
| 2-hexanone | 100.159 | $C_6H_{12}O$ | sharp |
| 3-methylhexane | 100.2 | $C_6H_{10}$ | gasoline-like odor |
| 4-methylcyclohexene | 96.17 | $C_7H_{12}$ | gasoline-like odor |
| 2-methyl-2,4-hexadiene | 96.17 | $C_7H_{12}$ | sweet, earthy |
| 2-methyl-1,4-pentadiene | 82.145 | $C_6H_{10}$ | |
| 3-methyl-1,4-pentadiene | 82.14 | $C_6H_{10}$ | fruity |
| 3-methyl-2-pentanone | 100.16 | $C_6H_{12}$ | sweet |
| 1-nonene | 126.24 | $C_9H_{18}O$ | gasoline-like odor |
| octane | 114.23 | $C_8H_{18}$ | gasoline-like odor |
| 1-octene | 112.24 | $C_8H_{16}$ | hydrocarbon |
| 2-propen-1-ol | 58.08 | $C_3H_6O$ | pungent, mustard-like |
| 2-propanol | 60.11 | $C_3H_8O$ | alcoholic smell, sharp, musty |
| 2-propanone | 58.08 | $C_3H_6O$ | minty, sweet |
| 1-propene | 42.08 | $C_3H_6$ | olefinic |
| 1-pentene | 70.13 | $C_5H_{10}$ | irritant, gasoline-like |
| pentanol | 86.13 | $C_5H_{10}O$ | strong acrid pungent odor |
| tert-butanol | 74.12 | $C_4H_9OH$ | banana-like, harsh, alcoholic, sweet |
| 2,3,4-trimethylpentane | 114.23 | $C_8H_{18}$ | gasoline-like odor |

TABLE 2

Removal Capability of Films having Scavengers to Remove Odor Causing VOCs

| | Scavenger in Odor Barrier Film | | | | |
|---|---|---|---|---|---|
| VOC | ZnO | Abscents 3000 | Zeolite 13X | MgO | SYLOID® Al-1 |
| acetaldehyde | not blocked | removed | removed | removed | removed |
| acetic acid | removed | removed | removed | removed | removed |
| methyl acrylate | removed | removed | removed | removed | removed |
| benzaldehyde | removed | removed | removed | removed | removed |
| bicyclo(4,1,0)hept-2-ene | removed | removed | removed | removed | removed |
| 2-butene | not blocked | not blocked | removed | not blocked | removed |
| 2-butenal | removed | removed | removed | removed | removed |
| butanal | removed | removed | removed | removed | removed |
| 2-butanone | not blocked | not blocked | removed | not blocked | removed |
| 2-butanol | not blocked | removed | removed | removed | removed |
| 2-buten-1-ol | not blocked | removed | not blocked | removed | not blocked |
| cyclopentanone | removed | removed | removed | removed | removed |
| 1-decene | removed | removed | removed | removed | removed |
| furan | removed | removed | removed | removed | removed |
| 3-ethyl-2-hexene | not blocked | not blocked | removed | not blocked | removed |
| 1,3-cycloheptadiene | removed | removed | removed | removed | removed |
| 3-cyclohexenylmethanol | removed | removed | removed | removed | removed |
| 3-cyclohexene-1-carboxaldehyde | removed | removed | removed | removed | removed |
| 2,4-hexadiene | removed | removed | removed | removed | removed |
| heptanal | removed | removed | removed | removed | removed |
| 2-heptanaone | removed | removed | removed | removed | removed |
| 1,2-heptadiene | not blocked | removed | not blocked | removed | removed |
| hexanal | removed | removed | removed | removed | removed |
| 2-hexanone | removed | removed | removed | removed | removed |
| 3-methylhexane | not blocked | removed | removed | removed | removed |
| 4-methylcyclohexene | not blocked | removed | not blocked | removed | removed |
| 2-methyl-2,4-hexadiene | not blocked | not blocked | removed | not blocked | not blocked |
| 2-methyl-1,4-pentadiene | removed | removed | removed | removed | not blocked |
| 3-methyl-1,4-pentadiene | not blocked | removed | removed | removed | removed |
| 3-methyl-2-pentanone | not blocked | not blocked | removed | not blocked | removed |
| 1-nonene | not blocked | not blocked | removed | not blocked | removed |
| octane | not blocked | not blocked | removed | not blocked | removed |
| 1-octene | not blocked | not blocked | removed | not blocked | removed |
| 2-propen-1-ol | not blocked | not blocked | removed | not blocked | removed |
| 2-propanol | not blocked | not blocked | removed | not blocked | removed |
| 2-propanone | not blocked | not blocked | removed | not blocked | removed |
| 1-propene | not blocked | removed | not blocked | not blocked | removed |

TABLE 2-continued

Removal Capability of Films having Scavengers to Remove Odor Causing VOCs

| VOC | Scavenger in Odor Barrier Film | | | | |
|---|---|---|---|---|---|
| | ZnO | Abscents 3000 | Zeolite 13X | MgO | SYLOID® Al-1 |
| 1-pentene | not blocked | not blocked | removed | not blocked | removed |
| pentanol | removed | removed | removed | removed | removed |
| tert-butanol | not blocked | not blocked | not blocked | not blocked | not blocked |
| 2,3,4-trimethylpentane | not blocked | not blocked | removed | removed | removed |
| % VOCs removed | 46% | 66% | 88% | 66% | 90% |

Example 2

Table 3 identifies the concentration of the combined doses of odor causing VOC scavengers used in a layer.

TABLE 3

Films having Combined Doses of Odor Causing VOC Scavengers

| | Concentration, wt % | | | | |
|---|---|---|---|---|---|
| Film ID | Zeolite 13X | Abscents 3000 | MgO | ZnO | SYLOID® Al-1 |
| 6051 | 3.04 | 0.18 | 0.15 | 0.12 | 0.10 |
| 6053 | 3.02 | 0.18 | 0.15 | 0.12 | 0.10 |
| 6054 | 3.09 | 0.18 | 0.15 | 0.12 | 0.10 |
| 6121 | 3.45 | 0.08 | 0.22 | 0.22 | 0.10 |
| 6122 | 3.83 | 0.08 | 0.22 | 0.22 | 0.10 |
| 6123 | 3.69 | 0.08 | 0.22 | 0.22 | 0.10 |
| 6124 | 3.24 | 0.07 | 0.14 | 0.14 | 0.09 |
| 6125 (1) | 3.97 | 0.07 | 0.14 | 0.14 | 0.09 |
| 6125 (2) | 3.97 | 0.07 | 0.14 | 0.14 | 0.09 |
| 6126 (1) | 2.43 | 0.07 | 0.14 | 0.14 | 0.09 |
| 6126 (2) | 2.43 | 0.07 | 0.14 | 0.14 | 0.09 |
| 6127 (1) | 1.88 | 0.07 | 0.14 | 0.14 | 0.09 |
| 6127 (2) | 1.88 | 0.07 | 0.14 | 0.14 | 0.09 |

Table 4 shows the ability of the film samples identified in Table 3 to remove odor causing VOCs.

Example 3

Table 5 identifies the concentration of the combined doses of odor causing VOC scavengers used in embodiments of an aspect of the invention that does not include odor causing VOC blocking layers.

TABLE 4

Removal Capability of Films having Combined Doses of Odor Causing VOC Scavengers

| | Film ID and VOC Detection, ppm (nd = not detected) | | | | | | | 6125 | | 6126 | | 6127 | |
|---|---|---|---|---|---|---|---|---|---|---|---|---|---|
| VOC | 6051 | 6053 | 6054 | 6121 | 6122 | 6123 | 6124 | 1 | 2 | 1 | 2 | 1 | 2 |
| 1-propene | nd | nd | nd | nd | nd | nd | nd | nd | nd | nd | nd | nd | nd |
| tert-butanol | 0.4 | 0.4 | 0.3 | 2.6 | 2.4 | 2.4 | 1.9 | 0.8 | 0.4 | 0.2 | 1.2 | 1.9 | 1.2 |
| 2-buten-1-ol | 7.2 | 8.1 | 5.8 | nd | nd | nd | nd | nd | nd | nd | nd | nd | nd |
| 2-methyl-2,4-hexadiene | 2.4 | 6.8 | 2.8 | 2.2 | 2.3 | 2.2 | 1.2 | 0.9 | 1.3 | 2.9 | 1.1 | 1.4 | 2.1 |
| 2-methyl-1,4-pentadiene | nd | nd | nd | nd | nd | nd | 1.9 | 0.6 | nd | 2.8 | 1.2 | 1.0 | nd |
| 2-propen-1-ol | nd | nd | nd | nd | nd | nd | nd | nd | nd | nd | nd | nd | nd |
| 2-propanol | nd | nd | nd | 1.5 | nd | nd | 0.9 | 1.5 | nd | nd | nd | nd | nd |
| 2,3,3-trimethylpentane | 9.7 | 14.2 | 12.8 | nd | 2.7 | nd | nd | 2.3 | nd | 1.7 | 2.4 | nd | nd |
| pentanal | nd | nd | nd | 7.2 | nd | nd | nd | nd | nd | nd | nd | nd | nd |
| hexanal | 2.9 | 7.3 | 3.8 | nd | nd | nd | nd | nd | nd | nd | nd | nd | nd |
| hexane | 1.0 | 1.5 | 1.1 | nd | nd | nd | nd | nd | nd | nd | nd | nd | nd |
| heptanal | 2.4 | 3.6 | 2.8 | nd | nd | nd | nd | nd | nd | nd | nd | nd | nd |
| nonane | 1.3 | 1.6 | 0.8 | nd | nd | nd | nd | nd | nd | nd | nd | nd | nd |

TABLE 5

Odor scavenger layers in Films without Odor Causing VOC Blocking Layers

| Film ID | Zeolite 13X | Abscents 3000 | ZnO | MgO |
|---|---|---|---|---|
| 6111 | 4.0 | 0.6 | 0.75 | 1.0 |
| 5969 | 3.0 | 0.6 | 0.75 | 1.0 |
| 5970 | 3.0 | 0.6 | 0.75 | 1.0 |
| 5971 | 3.0 | 0.6 | 0.75 | 1.0 |
| 5972 | 3.0 | 0.6 | 0.75 | 1.0 |

Table 6 shows the measured compound concentration development in the films of Table 5 that do not have any odor causing VOC blocking layers. The control film has no odor causing VOC scavengers. As shown in Table 6, the extent of any potential hydrogen sulfide development after a period of 20 days is eliminated while the extent of methyl sulfide development is reduced.

TABLE 6

Measured Compound Concentration Development in Films without Odor Causing VOC Blocking Layers

| Compound | Day | Control | 5969 | 5970 | 5971 | 5972 |
|---|---|---|---|---|---|---|
| hydrogen sulfide | 6 | nd | nd | nd | nd | nd |
|  | 12 | nd | nd | nd | nd | nd |
|  | 20 | 19.8 | nd | nd | nd | nd |
| 1-butanol | 6 | Nd | nd | nd | nd | nd |
|  | 12 | nd | nd | nd | nd | nd |
|  | 20 | nd | nd | nd | nd | nd |
| butanal | 6 | nd | nd | nd | nd | nd |
|  | 12 | nd | nd | nd | nd | nd |
|  | 20 | nd | nd | nd | nd | nd |
| ethanol | 6 | nd | nd | nd | nd | nd |
|  | 12 | nd | nd | nd | nd | nd |
|  | 20 | nd | nd | nd | nd | nd |
| methyl sulfide | 6 | 8.8 | 3.8 | 4.5 | 6.6 | 6.9 |
|  | 12 | 13.7 | 5.5 | 11.3 | 12.0 | 11.1 |
|  | 20 | 21.9 | 6.5 | 10.8 | 9.2 | 15.0 |
| dimethyl disulfide | 6 | nd | nd | nd | nd | nd |
|  | 12 | nd | nd | nd | nd | nd |
|  | 20 | nd | nd | nd | nd | nd |
| 4-methyl-1-ocene | 6 | nd | nd | nd | nd | nd |
|  | 12 | nd | nd | nd | nd | nd |
|  | 20 | nd | nd | nd | nd | nd |
| hexanal | 6 | nd | nd | nd | nd | nd |
|  | 12 | nd | nd | nd | nd | nd |
|  | 20 | nd | nd | nd | nd | nd |

Example 4

Another test was performed to evaluate VOC odor scavenging when the food product is a liquid, specifically milk. The milk tested was boiled and then cooled in a process that allowed the milk to be packaged for about 30 days. A sniff port GC/O/MS was used to identify and measure the organoleptic compounds in the milk at different stages. The stages included 1) Day 0 control milk, where the milk was commercially pasteurized whole milk purchased at a grocery store identified as "fresh", 2) Day 0 milk right after pasteurization at 185° F. for 5 minutes identified also as "boiled" (which generates significantly more VOCs), 3) Day 1 analysis of the scavengers placed in 3 films and a control film with no scavengers plus original milk stored in glass vials from the pasteurizing and fresh milk, 4) Day 4 analysis of films plus original milk stored in glass vials from the pasteurizing and fresh milk, and 5) Day 7 analysis of films plus original milk stored in glass vials from the pasteurizing and fresh milk.

Table 7 identifies the concentration of the combined doses of odor causing VOC scavengers used in a layer.

TABLE 7

Odor scavenger layers in Films for Liquid Food Product Testing

| Film ID | Zeolite 5A | Abscents 3000 | ZnO | MgO | Zeolite 13X |
|---|---|---|---|---|---|
| 6490 | 12.5 | 0 | 0 | 0 | 0 |
| 6486 | 0 | 0 | 0 | 0 | 12.5 |
| 6494 | 0 | 0 | 0 | 0 | 0 |
| 6111 | 0 | 0.6% | 0.75 | 1.0 | 4.8 |

Table 8 shows the ability of the film samples identified in Table 7 to remove odor causing VOCs.

TABLE 8

Measured Compound Concentration Development in Films without Odor Causing VOC Blocking Layers for Liquid Food Product Testing

| Compound | Day | Control-Fresh | Control-Boiled | 6490 | 6486 | 6494 | 6111 |
|---|---|---|---|---|---|---|---|
| L-cystine | 0 | 41% | 100% | — | — | — | — |
|  | 1 | 57% | 110% | 8% | 11% | 67% | 72% |
|  | 4 | 74% | 75% | 23% | 25% | 60% | 2% |
|  | 7 | 76% | 135% | 23% | 28% | 130% | 14% |
| Formic acid | 0 | 33% | 100% | — | — | — | — |
|  | 1 | 148% | 281% | 0% | 13% | 120% | 53% |
|  | 4 | 51% | 272% | 0% | 98% | 97% | 37% |
|  | 7 | 178% | 183% | 0% | 283% | 153% | 143% |
| Acetic Acid | 0 | 45% | 100% | — | — | — | — |
|  | 1 | 253% | 1062% | 133% | 45% | 202% | 104% |
|  | 4 | 55% | 1306% | 0% | 283% | 162% | 57% |
|  | 7 | 706% | 283% | 0% | 65% | 138% | 301% |
| 2-furanmethanol | 0 | 37% | 100% | — | — | — | — |
|  | 1 | 69% | 132% | 118% | 104% | 94% | 92% |

TABLE 8-continued

Measured Compound Concentration Development in Films without Odor
Causing VOC Blocking Layers for Liquid Food Product Testing

| | | Film ID and Compound Concentration | | | | | |
|---|---|---|---|---|---|---|---|
| Compound | Day | Control-Fresh | Control-Boiled | 6490 | 6486 | 6494 | 6111 |
| | 4 | 16% | 137% | 17% | 71% | 64% | 40% |
| | 7 | 201% | 188% | 204% | 160% | 130% | 34% |
| 2(5H)-furanone | 0 | 17% | 100% | — | — | — | — |
| | 1 | 22% | 252% | 0% | 123% | 91% | 67% |
| | 4 | 29% | 276% | 0% | 77% | 90% | 21% |
| | 7 | 179% | 169% | 0% | 21% | 21% | 117% |
| 2-furfural | 0 | 7% | 100% | — | — | — | — |
| | 1 | 120% | 150% | 0% | 0% | 0% | 5% |
| | 4 | 8% | 326% | 0% | 0% | 0% | 8% |
| | 7 | 159% | 182% | 0% | 0% | 0% | 6% |
| furylhydroxymethylketone | 0 | nd | 100% | — | — | — | — |
| | 1 | 1% | 70% | 7% | 52% | 51% | 12% |
| | 4 | 5% | 81% | 6% | 22% | 21% | 6% |
| | 7 | 53% | 58% | 24% | 63% | 65% | 34% |
| 1-hexadecanoic acid | 0 | nd | 100% | — | — | — | — |
| | 1 | nd | 286% | 0% | 0% | 0% | 0% |
| | 4 | nd | 343% | 0% | 0% | 0% | 0% |
| | 7 | 241% | 137% | 0% | 0% | 0% | 0% |
| 2,3-dihydro-3,5-dihydroxy-6-methyl-4H-pyran-4-one | 0 | nd | 100% | — | — | — | — |
| | 1 | 15% | 206% | 79% | 104% | 145% | 89% |
| | 4 | 8% | 238% | 28% | 59% | 75% | 37% |
| | 7 | 114% | 175% | 101% | 170% | 167% | 114% |
| gamma-undecalactone | 0 | 83% | 100% | — | — | — | — |
| | 1 | 269% | 404% | 136% | 144% | 53% | 110% |
| | 4 | 63% | 524% | 0% | 65% | 108% | 45% |
| | 7 | 300% | 245% | 220% | 402% | 467% | 182% |
| 5-hydroxymethyl-furfural | 0 | 0% | 100% | — | — | — | — |
| | 1 | 0% | 184% | 89% | 123% | 15% | 11% |
| | 4 | 0% | 211% | 20% | 85% | 7% | 29% |
| | 7 | 28% | 213% | 84% | 128% | 147% | 17% |

There was some variation in the data. Some of this may be attributed to the samples frozen at the time of preparation (samples had to be tested offsite). Then, the samples were thawed and measured on the GC/MS. The vials were placed in a carousel that took up to 24 hours for the last samples to be measured. Milk is known to be very susceptible to light and may have oxidized introducing variation of quantities of some of these measured compounds.

Day 0 boiled control generally was the highest peak area (where the area under the curve is proportional to the quantity), therefore it was set to 100%. The other values in the chart were then depicted as being below (where there is a reduction in the amount of the particular compound) or greater than 100% where the amount of the compound increased and not absorbed. Many of the compounds detected showed some degree of absorption, adsorption, or change by chemical reaction by the scavengers. For example, L-cystine increased by 10% in the boiled control on day 1. This may be normal test variation. The 6494 film (control, no scavengers) started at 67% on day 1 and generally increased over the 7 day test period. This is expected in the normal bacterial & enzymatic degradation aging process of milk. The films with scavengers, 6490, 6486 and 6111, showed varying degrees of ability of reducing the L-cystine. Note that the L-cystine would normally be increasing over time. Ultimately, the level of odor masterbatch could be targeted to control the L-cystine below a certain level at the end of the expected shelf life. Odors and taste are not mutually exclusive and it may be desirable to have these compounds controlled between certain levels as it contributes to a positive attribute of the taste. In the case of acetol, this compound was not detected (nd) after boiling, but was found subsequently. Using the area under the curve analysis, created a division by 0, so it was given an "nd" designation. This compound and 10 other VOCs were not included in the table as at every day for each film the data was "nd" and both controls, fresh and boiled, had no detection of these compounds at day 0. The compounds were as follows: decanoic acid, d-mannose, tetradecanoic acid, R-cystine, acetol, 1,2-cyclopentadione, 3-methyl-2,5-furandione, 2,4-dihydroxy-2,5-dimethyl-3(2H)furan-3-one, trimethylamine, maltol, and undecane.

These results were surprising as it was expected for the liquid to interfere with the oxygen scavenging effectiveness of the film. For example, previous testing showed that when oxygen scavenging film containing zeolite 13X was exposed to greater than 30% relative humidity, the effectiveness of the odor scavenging ability of zeolite 13X due to the hygroscopic nature of zeolite 13X was reduced. Additionally, when extruding oxygen scavenging film, it has been shown that water plugs the zeolite pores and reduces the capacity of the scavengers. It has also been shown that water affects the ability of the film to absorb gaseous materials. In conclusion, the scavengers present in the films: 6490, 6486, and 6111 were able to effectively remove or lower many of the VOCs from a liquid environment. This has been previously shown in a headspace of air or some other gas such as carbon dioxide or nitrogen, but not a liquid.

Many modifications and other embodiments of the invention set forth herein will come to mind to one skilled in the art to which this invention pertains having the benefit of the teachings presented in the descriptions herein and the associated drawings. It will be appreciated by those skilled in the art that changes could be made to the embodiments described herein without departing from the broad inventive concept thereof. Therefore, it is understood that this invention is not limited to the particular embodiments disclosed, but it is intended to cover modifications within the spirit and scope of the present invention as defined by the included claims.

That which is claimed:

1. A film comprising:
a skin layer defining an outside surface of the film;
a sealant layer defining a surface of the film intended to be adjacent to a packaged product;
a volatile organoleptic compound barrier layer comprises a cyclic olefin copolymer;
an oxygen barrier layer; and
an odor scavenger layer disposed between the volatile organoleptic compound barrier layer and the oxygen barrier layer;
wherein the volatile organoleptic compound barrier layer is disposed between the sealant layer and the oxygen barrier layer, and the odor scavenger layer comprises a zeolite formulation that contains the release of odor causing volatile organoleptic compounds (VOCs) over a period of at least 20 days, wherein the zeolite formulation comprises a blend comprising aluminosilicate based zeolite of the linear formula (SiO2)x(Al2O3)y; ZnO; MgO; and at least one of zeolite 5A or zeolite 13X.

2. The film of claim 1, further comprising at least one film strengthening layer.

3. The film of claim 1, further comprising at least one oxygen scavenger layer.

4. The film of claim 1, wherein the zeolite formulation has a range of from about 0.5 wt % to about 20 wt % of zeolite 5A, about 1 wt % to about 20 wt % of zeolite 13X, a range of from about 0.04 wt % to about 5 wt % of aluminosilicate based zeolite of the linear formula $(SiO_2)_x(Al_2O_3)_y$, a range of from about 0.08 wt % to about 6 wt % of MgO, and a range of from about 0.08 wt % to about 5 wt % of ZnO based upon a total weight of the odor scavenger layer.

5. The film of claim 1, wherein the zeolite formulation has a range of from about 1 wt % to about 5 wt % of zeolite 5A, from about 3 wt % to about 4 wt % of zeolite 13X, a range of from about 0.5 wt % to about 0.7 wt % aluminosilicate based zeolite of the linear formula $(SiO_2)_x(Al_2O_3)_y$, a range of from about 0.65 wt % to about 0.95 wt % of ZnO, and from about 0.9 wt % to about 1.1 wt % MgO based upon a total weight of the odor scavenger layer.

6. The film of claim 1, wherein the zeolite formulation comprises zeolites having pore sizes ranging from about 1 to about 12 angstroms.

7. The film of claim 1, wherein the odor causing volatile organoleptic compounds has a molecular weight of greater than about 40.

8. The film of claim 1, wherein the oxygen barrier layer comprises an active oxygen barrier layer.

* * * * *